(12) United States Patent
Maric et al.

(10) Patent No.: US 11,360,317 B2
(45) Date of Patent: *Jun. 14, 2022

(54) DYNAMIC SEALS FOR ADJUSTABLE DISPLAY DEVICES

(71) Applicant: Apple Inc., Cupertino, CA (US)

(72) Inventors: Ivan S. Maric, Sunnyvale, CA (US); Onur I. Ilkorur, Campbell, CA (US); Jia Tao, Santa Clara, CA (US); Kuldeep P. Lonkar, Sunnyvale, CA (US); Stephen E. Dey, San Francisco, CA (US); Phil M. Hobson, Menlo Park, CA (US); Jeremy C. Franklin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/073,551

(22) Filed: Oct. 19, 2020

(65) Prior Publication Data

US 2021/0033874 A1 Feb. 4, 2021

Related U.S. Application Data

(63) Continuation of application No. 16/294,156, filed on Mar. 6, 2019, now Pat. No. 10,823,971.

(60) Provisional application No. 62/731,109, filed on Sep. 14, 2018.

(51) Int. Cl.
*G02B 27/01* (2006.01)

(52) U.S. Cl.
CPC .. *G02B 27/0176* (2013.01); *G02B 2027/0154* (2013.01)

(58) Field of Classification Search
CPC .............. G02B 27/017; G02B 27/0172; G02B 27/0176; G02B 2027/0174; G02B 2027/0178; H04N 13/332–344
See application file for complete search history.

(56) References Cited

U.S. PATENT DOCUMENTS

| 4,836,560 | A | 6/1989 | Haberberger |
| 5,696,521 | A | 12/1997 | Robinson et al. |
| 5,966,167 | A | 10/1999 | Nose et al. |

(Continued)

FOREIGN PATENT DOCUMENTS

| CN | 1042403 A | 5/1990 |
| CN | 2729433 Y | 9/2005 |

(Continued)

*Primary Examiner* — Gene W Lee
(74) *Attorney, Agent, or Firm* — Young Basile Hanlon & MacFarlane, P.C.

(57) ABSTRACT

A wearable display system includes a housing, a display module positioned within the housing and including a lens and a display panel, and a seal extending between the housing and the display module. The seal is configured to allow relative movement between the lens and the display panel to adjust focus of the display panel. In one aspect, the seal includes first and second segments with generally linear configurations and a third segment with an arcuate configuration that is positioned between the first and second segments. In another aspect, the seal includes a first portion with an arcuate configuration and a second portion with a linear configuration and a bellows portion. In another aspect, the seal includes corrugations to facilitate controlled deformation of the seal during relative movement of the display module.

20 Claims, 8 Drawing Sheets

(56) References Cited

U.S. PATENT DOCUMENTS

| | | | |
|---|---|---|---|
| 5,991,085 | A | 11/1999 | Rallison et al. |
| 9,274,340 | B2 | 3/2016 | Lyons |
| 10,492,346 | B2 | 11/2019 | Selvakumar et al. |
| 2010/0133758 | A1 | 6/2010 | Kanzaki et al. |
| 2015/0138645 | A1 | 5/2015 | Yoo et al. |
| 2015/0253574 | A1 | 9/2015 | Thurber |
| 2016/0320612 | A1 | 11/2016 | Zhang |
| 2019/0212568 | A1 | 7/2019 | Yan |
| 2019/0339523 | A1 | 11/2019 | Evans et al. |

FOREIGN PATENT DOCUMENTS

| | | |
|---|---|---|
| CN | 104395816 A | 3/2015 |
| CN | 104793452 A | 7/2015 |
| CN | 105134951 A | 12/2015 |
| CN | 205787312 U | 12/2016 |
| CN | 206147181 U | 5/2017 |
| CN | 107448603 A | 12/2017 |
| EP | 0255662 B1 | 5/1990 |
| GB | 2224321 A | 5/1990 |
| JP | 2000347086 A | 12/2000 |
| JP | 2004048266 A | 2/2004 |
| JP | 2008032208 A | 2/2008 |

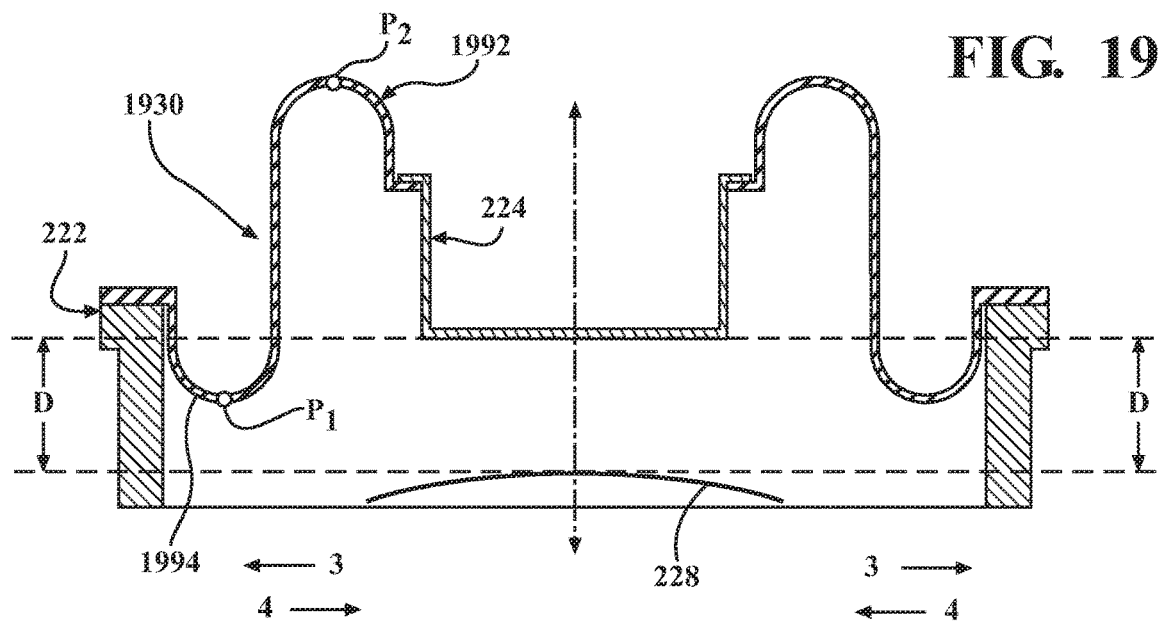
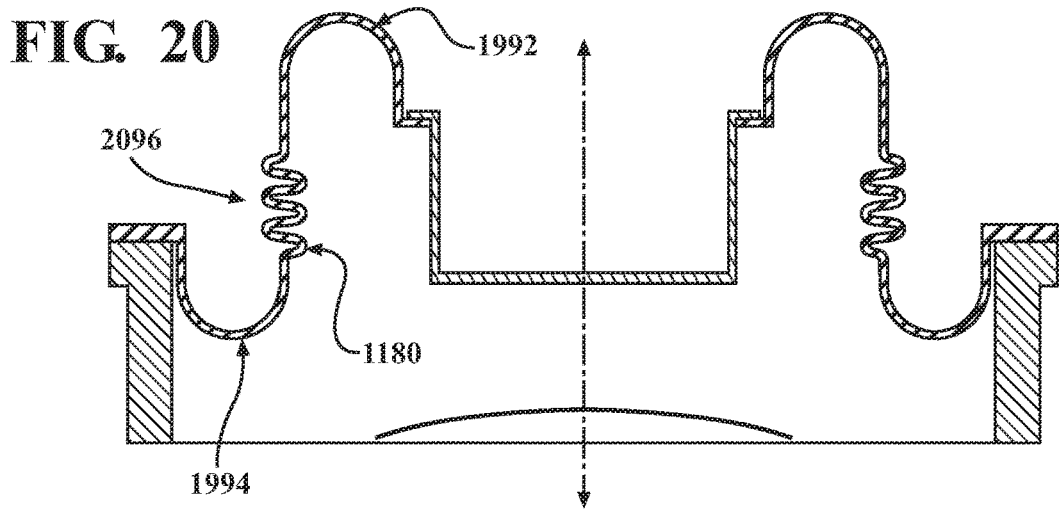
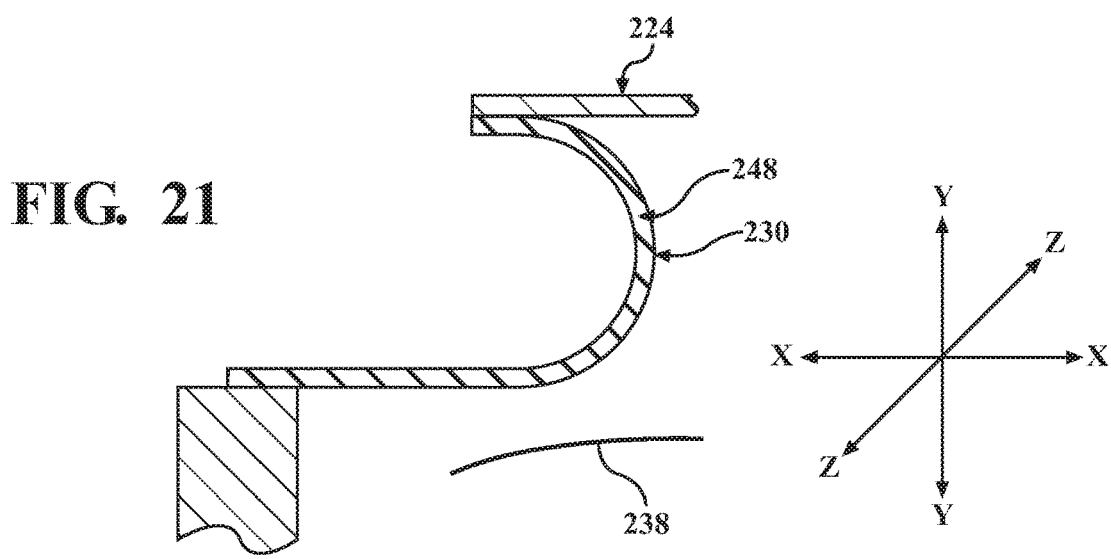

DYNAMIC SEALS FOR ADJUSTABLE DISPLAY DEVICES

CROSS-REFERENCE TO RELATED APPLICATIONS

This application is a continuation of U.S. patent application Ser. No. 16/294,156, filed Mar. 6, 2019, now U.S. Pat. No. 10,823,971, entitled "Dynamic Seals for Adjustable Display Devices," which claims priority to U.S. Provisional Application Ser. No. 62/731,109, filed Sep. 14, 2018, entitled "Dynamic Seals for Adjustable Display Devices," the contents of which are incorporated herein by reference.

FIELD

The present disclosure relates generally to display technologies, and, more particularly, to internal seals for display devices, such as, for example, wearable head-mounted displays (HMDs) with high-resolution panels.

BACKGROUND

High-resolution display devices, such as wearable HMDs, for example, include a variety of delicate internal components (e.g., display panels and lenses) that are often highly sensitive to water, moisture, particulate, debris, dust, etc. It would thus be desirable to house such components in a sealed internal compartment. During use, however, it is often necessary to adjust the position of the display panel and/or the internal lens along one or more axes to adjust focus, correct distortion, alignment, or field-of-view issues, improve content accommodation, etc. The seal(s) used to protect the internal components must allow for such movement without overly taxing the adjustment mechanism, which is typically small and lightweight given the limited interior space and intended use of the system and must be highly durable to resist fatigue that might otherwise occur over a large number of adjustment cycles. The seals must also allow for a sufficiently large range of motion depending, for example, upon the diopter range covered by the adjustment mechanism.

SUMMARY

In one aspect of the present disclosure, a wearable display system is described that includes an internal housing; a lens that is positioned within the internal housing; a display module including a display panel that is positioned within the internal housing to allow for relative movement between the lens and the display module to adjust focus of the display panel; and a seal that extends between the internal housing and the display module so as to permit relative movement between the lens and the display module.

In certain embodiments, the seal may include a generally J-shaped configuration defining a generally linear segment and an arcuate segment extending from the linear segment. In such embodiments, one of the linear segment and the arcuate segment is connected to the display module, and the other of the linear segment and the arcuate segment is connected to the internal housing. It is also envisioned that the seal may include a generally U-shaped configuration defining a pair of generally linear segments that are separated by a generally arcuate segment. More specifically, the seal may include a first generally linear segment that is connected to the display module and a second generally linear segment that is connected to the internal housing.

In certain embodiments, the arcuate segment may include a series of corrugations to facilitate controlled deformation of the seal during relative movement between the lens and the display module.

In certain embodiments, the seal may include a first segment having an arcuate configuration and a second segment including a bellows portion. In alternate embodiments it is envisioned that the bellows portion may include a series of interconnected arcuate wall portions or a series of interconnected linear wall portions. In such embodiments, adjacent linear wall portions may be connected so as to define vertices (apices).

In certain embodiments, the seal may include a generally C-shaped cross-sectional configuration defining a curvature that extends inwardly away from the internal housing or outwardly towards the internal housing.

In certain embodiments, the seal may include a generally sinusoidal (S-shaped) configuration defining a first arcuate segment extending in a first direction and a second arcuate segment extending in a second direction opposite the first direction. In such embodiments, the first arcuate segment is connected to the display module, and the second arcuate segment is connected to the internal housing.

In certain embodiments, the display module may be movable in relation to the internal housing, whereas in certain other embodiments, the lens may be movable in relation to the internal housing. It is also envisioned that, in certain embodiments, both the display module and the lens may be movable in relation to the internal housing.

In another aspect of the present disclosure, a seal is disclosed for use in a wearable display system including an internal housing and a display panel that is supported by a movable display module to adjust focus of the display panel. The seal includes a first portion that is connectable to the internal housing, and a second portion that is connectable to the display module. The seal includes (e.g., is formed from) a deformable material to permit movement of the display module.

In certain embodiments, the seal may include a first segment that is generally linear in configuration and a second segment that is generally arcuate in configuration such that the seal is generally J-shaped. Alternatively, the seal may include a pair of generally linear segments that are separated by a generally arcuate segment such that the seal is generally U-shaped.

In certain embodiments, the second (arcuate) segment of the seal may include a series of corrugations to facilitate controlled deformation of the seal during movement of the display module.

In certain embodiments, the seal may include a generally arcuate portion and bellows portion adjacent to the generally arcuate portion.

In certain embodiments, the seal may include a generally C-shaped cross-sectional configuration defining a curvature that extends either inwardly away from the internal housing or outwardly towards the internal housing.

In another aspect of the present disclosure, a method is disclosed for assembling a wearable display system. The method includes positioning a display module having a display panel within an internal housing; positioning a lens within the internal housing to allow for relative movement between the display module and the lens to adjust focus of the display panel;

and positioning a seal within the internal housing to define an enclosed interior space accommodating the display panel. The seal includes a deformable material to permit relative movement between the display module and the lens.

In certain embodiments, positioning the seal within the internal housing may include connecting a first segment of the seal to the display module and connecting a second segment of the seal to the internal housing, wherein one of the first and second segments includes a generally linear configuration and the other of the first and second segments includes a generally arcuate configuration such that the seal is generally J-shaped. Alternatively, positioning the seal within the internal housing may include connecting a first generally linear segment of the seal to the display module and connecting a second generally linear segment of the seal to the internal housing. In such embodiments, the first and second generally linear segments may be separated by a generally arcuate segment such that the seal is generally U-shaped.

BRIEF DESCRIPTION OF THE DRAWINGS

FIG. 19 is a partial, cross-sectional view of the display system seen in FIG. 1 including an alternate embodiment of the seal including a generally sinusoidal configuration;

FIG. 20 is a partial, cross-sectional view of the display system seen in FIG. 1 including an alternate embodiment of the seal seen in FIG. 19 including a bellows portion having linear wall portions;

FIG. 21 is a partial, cross-sectional view of an alternate embodiment of the display system seen in FIG. 1 in which the display module and/or the lens are movable along multiple axes;

DETAILED DESCRIPTION

Figure 1:
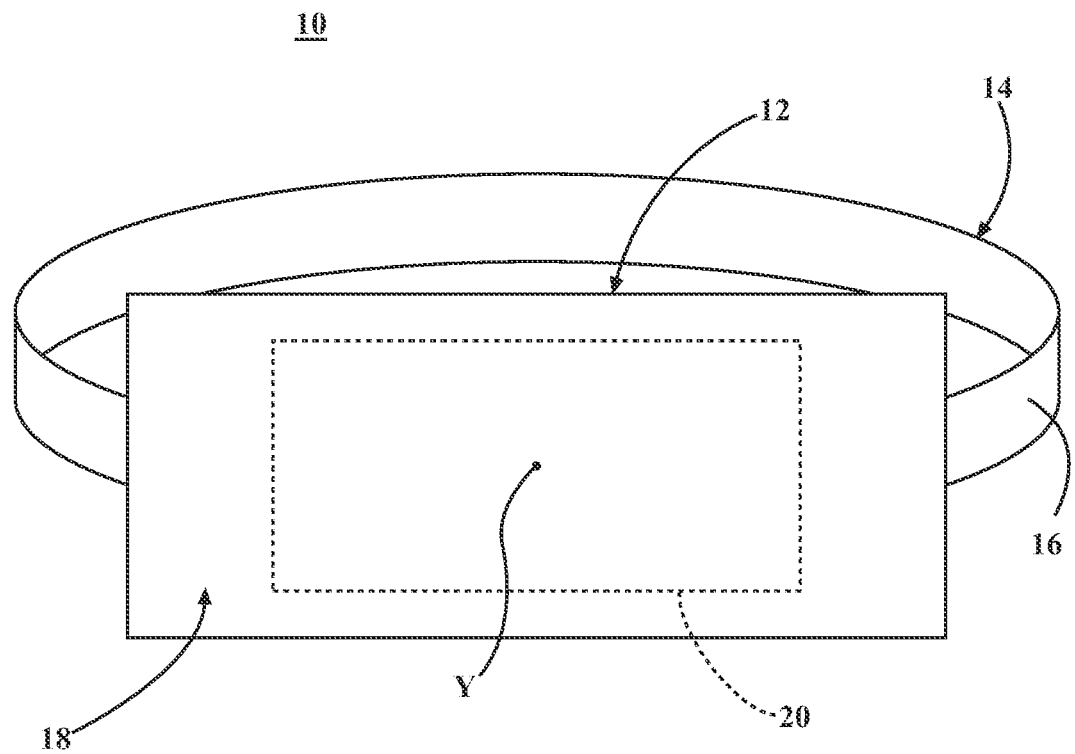
FIG. 1 is a top, perspective view of a display system configured as a wearable HMD in accordance with the principles of the present disclosure.

Display systems according to the present disclosure generally include an internal housing that accommodates a lens and a display panel supported by a display module, as well as an actuator that is configured and positioned to move the lens and/or the display module in relation to the internal housing along one or more axes. Relative movement between the lens and the display module allows for changes in focal length and, thus, adjustment in the focus of the display panel, as well as for the correction of distortion, alignment, or field-of-view issues, improvements in content accommodation, etc. To protect the internal components of the display system (e.g., the lens and the display panel) from water, moisture, particulate, debris, dust, etc., the present disclosure describes a variety of seals, as well as various methods of connecting the seals to the display system. Although the seals described herein are generally discussed in connection with a wearable HMD including a high-resolution display panel (e.g., an LED panel, an OLED panel, a uOLED panel, etc.), it should be appreciated that the seals and associated methods described herein may find applicability in a wide variety of systems.

In certain embodiments, the presently disclosed seals are configured and positioned to extend between the internal housing and the display module to define an interior space that accommodates the display panel and/or the lens). The seals include (e.g., are formed from) a deformable material that is durable, yet allows for bending, flexing, stretching, compression, expansion, rolling, twisting, or other deformation of the seals during relative movement between the lens and the display module without compromising the integrity of the enclosed interior space. The enclosed interior space, defined by the seal, in which the display panel and/or lens are accommodated can in some cases inhibit (or entirely prevent) the ingress of water, moisture, particulate, debris, dust, or other foreign material, to protect the display panel and/or lens. Throughout the present disclosure, the term "deform" (and variations thereof) should be understood as referring to any physical change(s) in the seal (e.g., changes in shape, orientation, or dimensions), examples of which are provided above, whether such changes can be described as elastic, compliant, or otherwise, during movement of the components with which the seal is associated.

The presently disclosed seals can be low-force members with high cycle-to-failure characteristics that accommodate relatively large ranges of travel to address the challenges in known systems discussed above. However, the seals can also be any combination of low-force members or high-force members having low cycle-to-failure or high cycle-to-failure characteristics and still be used to address the known system challenges. Various embodiments and configurations are described herein, including, for example, a J-shaped or U-shaped configuration, a bellows/accordion style configuration, a generally sinusoidal configuration, and a C-shaped configuration, to allow for flexibility in design, implementation, and use with a variety of display systems. In certain embodiments, the seals may also include corrugated portions to facilitate a controlled physical change in the seals during movement of the display module, for example, as well as a reduction in strain and the force required by the actuator. By varying the geometry of the seal, the material(s) used in the manufacture of the seal, etc., the seal can be customized and adapted for use with a wide variety of actuators and display systems to accommodate for variations in the system architecture, the output of the actuator, and spatial constraints, among other factors.

FIG. 1 generally illustrates a display system 10 in accordance with the principles of the present disclosure. In the embodiment seen in FIG. 1, the display system 10 is configured as an HMD 12 including one or more wearable supports 14. For example, the display system 10 may include a head strap 16, as shown in FIG. 1, or, alternatively, the display system 10 may include temples (not shown) such that the HMD 12 is supported by the user's ears. However, it should be appreciated that the configuration and/or intended use of the display system 10 may be varied in alternate embodiments of the disclosure. For example, in one implementation, it is envisioned that the display system 10 may be incorporated into a vehicle.

The display system 10 includes an external housing 18 defining an internal window 20 which may include an opening, one or more optical ports, or the like. The external housing 18 accommodates the internal structure and components of the display system 10 discussed herein and may include (e.g., may be formed from) any suitable material, such as, for example, polymers, plastics (ABS, PC, etc.), and metallic materials, either individually or in combination. The external housing 18 may be formed through any applicable method including, for example, injection molding, 3-D printing, or the like.

Figure 2A:
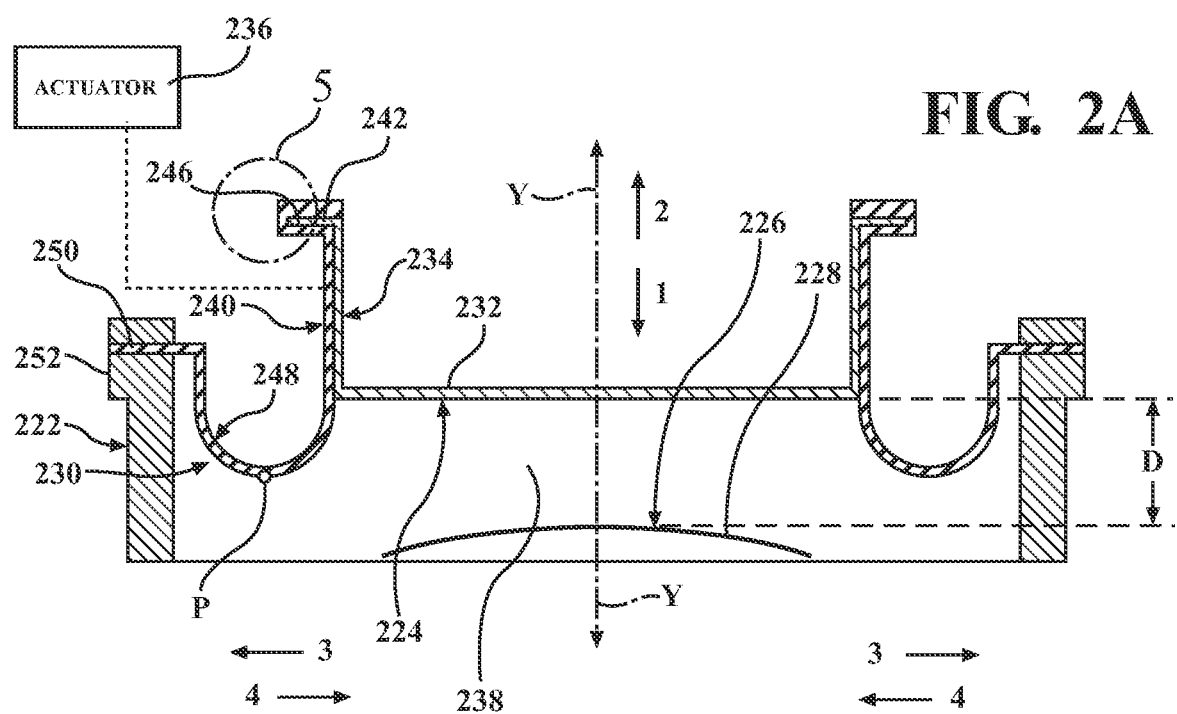
FIG. 2A is a partial, cross-sectional view of the display system seen in FIG. 1 including a display module, a lens, and one embodiment of an internal seal shown in an initial configuration.
Figure 2B:
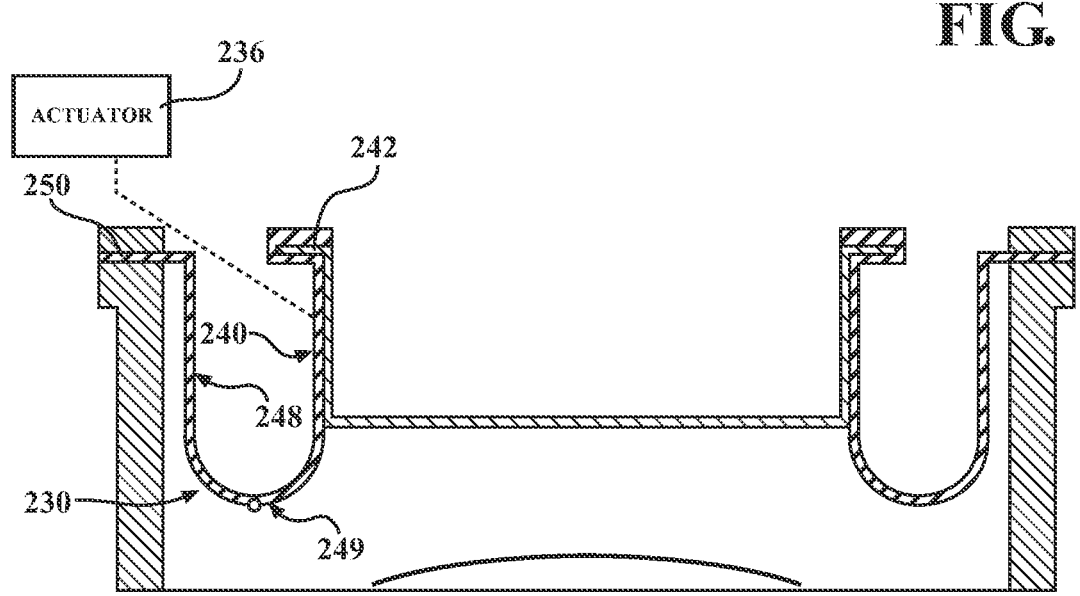
FIG. 2B is a partial, cross-sectional view of the display system seen in FIG. 1 including an alternate embodiment of the internal seal shown in an initial configuration.
Figure 3:
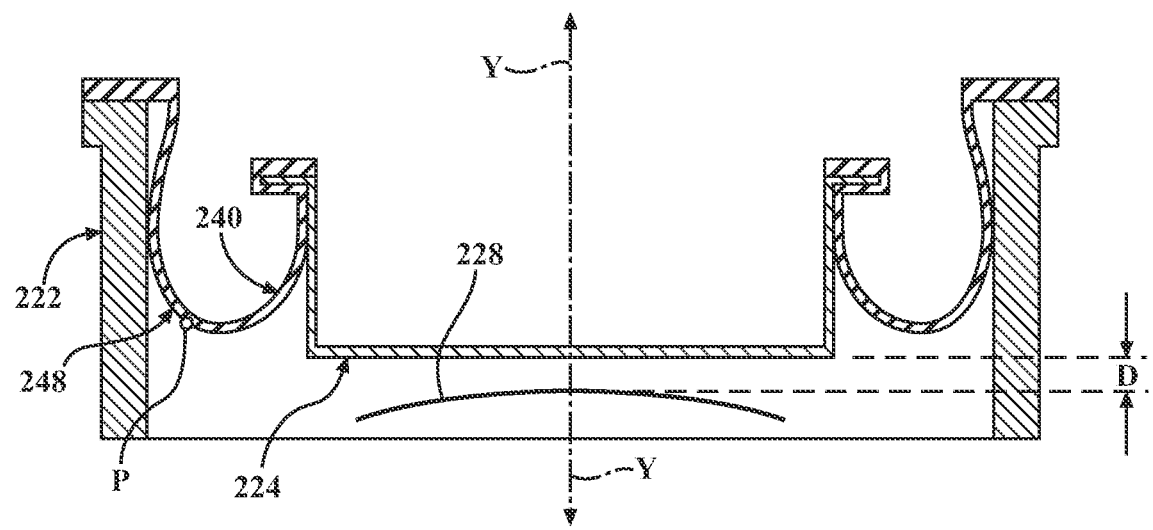
FIG. 3 is a partial, cross-sectional view of the display system seen in FIG. 1 illustrating the seal in a deformed configuration.

With reference now to FIGS. 1-3, the display system 10 includes an internal housing 222, a display module 224, an optical element 226 (e.g., a lens 228), and a seal 230, each of which is positioned within the confines of the external housing 18 (FIG. 1). The internal housing 222 supports the display module 224, in addition to other components of the display system 10 and may include any structure or architecture suitable for this intended purpose. The internal housing 222 may include (e.g., may be formed from) any suitable material, such as plastics like ABS or PC, metallic materials, polymers, etc., either individually or in combination, and may be formed through any applicable method of manufacture, such as 3-D printing, injection molding, etc.

The display module 224 includes a display panel 232 supported by a chassis 234 and is oriented such that the display panel 204 is visible through the window 20 (FIG. 1) in the external housing 18. The display panel 232 may be any panel suitable for the intended purpose of displaying an image, video, etc., including, for example, an LED panel, an OLED panel, a uOLED panel, or the like. The chassis 234 supports the display panel 204, either directly or indirectly, and may be connected to the display panel 204 in any suitable manner, such as through the use of one or more pressure-sensitive adhesives (PSAs), for example. The chassis 234 may be formed from any suitable material, such as plastics, polymeric materials, metallic materials, etc., and, in certain embodiments, may include one or more thermally-conductive materials and/or thermal members to facilitate the transfer of heat away from the display panel 232. For example, it is envisioned that the chassis 234 may include (e.g., may be formed from) stainless steel, copper, aluminum, magnesium, titanium, and alloys thereof, either individually or in combination, as well as fins, openings, or the like to increase the exposed surface area of the chassis 234 and, thus, its thermal conductivity.

To allow for adjustments during use of the display system 10, it is envisioned that the display module 224 and/or the lens 228 may be movable in relation to the internal housing 222. For example, the display system 10 may include one or more actuators 236 that are configured and positioned to act upon the display module 224 and/or the lens 228 to cause movement along one or more axes. In various embodiments of the disclosure, the display system 10 may include a single actuator 236 that acts upon the display module 224 and/or the lens 228, or a series of actuators 236 that cooperate to coordinate movement of the display module 224 and the lens 228, such as through the use of a controller (not shown). The actuator 236 may include any mechanism suitable for the intended purpose of causing relative movement between the internal housing 222, the display module 224, and/or the lens 228. For example, the actuator 236 may include a DC or piezoelectric motor, magnetic drivers, a voice coil, a gear system, a direct drive system, pulleys, or the like.

To facilitate movement of the display module 224 and/or the lens 228, a guide system (not shown) may be employed. For example, movement of the display module 224 and/or the lens 228 may be supported by a rail system, guide rods, or any other suitable structure or mechanism.

In the particular embodiment seen throughout the figures, the actuator 236 is illustrated and described as being configured and positioned to act on the display module 224 to move the display module in relation to the lens 228 and the internal housing 222 along a (vertical) longitudinal axis Y of the display system 10. More specifically, the display module 224 is movable along the Y-axis (i.e., towards and away from a user) through a range of motion that lies substantially within the range of approximately 4 mm to approximately 7 mm to vary the distance D defined between the display module 224 and the lens 228, and thereby adjust the focus of the display panel 232. It should be appreciated, however, that the range of motion for the display module 224 may be increased or decreased in alternate embodiments of the disclosure, depending, for example, upon the diopter range covered by the actuator 236, spatial allowances, system architecture, intended use of the display system 10, etc.

With continued reference to FIGS. 2A and 3, the seal 230 will be discussed. The seal 230 includes (e.g., is formed from) one or more deformable, durable materials capable of withstanding a high number of movement cycles. For example, it is envisioned that the seal 230 may include (e.g., may be formed from) any material suitable for the intended purpose of allowing for bending, flexing, stretching, compression, expansion, rolling, twisting, or other deformation of the seal 230 during movement of the structure(s) with which the seal 230 is associated or connected to, as discussed below, including silicone, PEEK, nylon or polyester sheets, tightly woven or non-porous fabrics, resin-impregnated fabrics, ePTFE membranes, foam(s), and the like, either individually or in combination. To facilitate the transfer of heat away from the display panel 232, it is envisioned that the seal 230 may include (e.g., may be formed from) one or more thermally-conductive materials, such as, for example, a flexible graphite sheet, or a fabric membrane including a conductive wire formed from copper, aluminum, etc. It is also envisioned that the seal 230 may include (e.g., may be formed from) a metallic foil, such as copper, aluminum, etc.; that a thermally-conductive material may be layered onto a body of the seal 230; or that an entire body or an external surface of the seal 230 may be doped with one or more thermally-conductive materials.

As seen in FIGS. 2A and 3, the seal 230 is configured and positioned to define an enclosed interior space 238 that accommodates the display panel 232. In certain embodiments, it is also envisioned that all or a portion of the lens 228 may be positioned (or movable through) the interior space 238. The seal 230 thus inhibits (or entirely prevents) the ingress of water, moisture, particulate, debris, dust, etc., to protect the display panel 232 and the lens 228, preserve image/video quality, and increase the usable life of the display system 10. In the particular embodiment illustrated in FIGS. 2A and 3, the seal 230 extends between the display module 224 and the internal housing 222. More specifically, the seal 230 includes a first segment 240 defining a first flange 242 that extends into contact with a corresponding support 244 defined by the display module, and a second segment 248 defining a second flange 250 that extends into engagement with a corresponding support 252 defined by the internal housing 222.

It is envisioned that the seal 230 may be connected to the internal housing 222 and the display module 224 in any suitable manner. For example, in one embodiment, the seal 230, the internal housing 222, and the display module 224 may be integrally (e.g., monolithically) formed from a single piece of material, such as silicone, for example. In such embodiments, it is envisioned that the seal 230 may include or omit the flanges 242, 250 (i.e., embodiments of the seal 230 devoid of the flanges 242, 250 would not be beyond the scope of the present disclosure). To strategically increase rigidity (e.g., of the internal housing 222 and/or the display module 224), one or more internal stiffeners (not shown) may be utilized. Alternatively, as seen in FIGS. 2A and 3, it is envisioned that the seal 230, the internal housing 222, and the display module 224 may be formed as separate components that are connected together. For example, the seal 230 may be overmolded to the display module 224 and the internal housing 222. Additionally, or alternatively, one or more PSAs may be utilized at the interfaces between the seal 230, the internal housing 222, and the display module 224.

In various implementations, depending upon the particular materials used in the manufacture of the seal 230, for example, it is envisioned that the PSA(s) utilized may be either symmetric or asymmetric. For example, the PSA(s) may include one or more internal layers formed from a first material, such as polyethylene terephthalate (PET), for example, interposed between opposed external layers formed from a second, different material (e.g., acrylic). Alternatively, in asymmetric applications, the external layers may be formed from different materials. For example, where the seal 230 contacts the display module 224 and the internal housing 222, acrylic may be replaced by silicone (or other such material used in the manufacture of the seal 230) to increase the strength of the bonds formed between the seal 230, the display module 224, and the internal housing 222.

Figure 4:
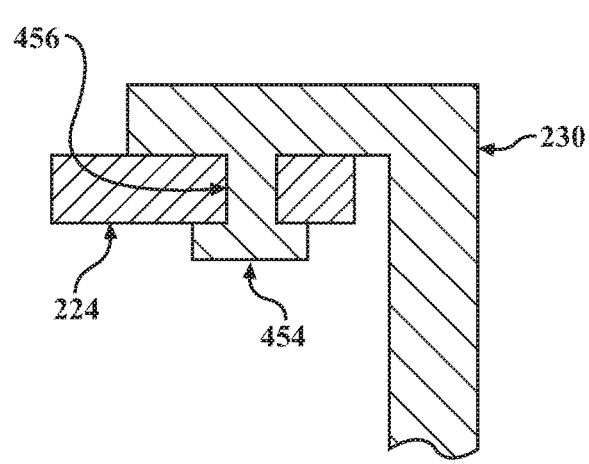
FIG. 4 is a partial, cross-sectional view illustrating one method of connecting the seal to the display module.

In addition to the use of overmolding and/or PSA(s), the seal 230 may be mechanically secured to the display module 224 and/or the internal housing 222. In the context of overmolding, for example, the seal 230 may include a plug 454 (FIG. 4) that is configured for engagement with a corresponding mating structure 456 defined by the display module 224. More specifically, the plug 454 includes a stem 458 that is configured for receipt within a corresponding opening 460 formed in the display module 224, and a cap 462 that extends across the opening 460 to secure the seal 230 to the display module 224 and inhibit (or entirely prevent) inadvertent disconnection of the seal 230 from the display module 224. Although shown in connection with the second segment 248 of the seal 230 and the display module 224, it should be appreciated that similar or identical structures may be incorporated into the first segment 240 of the seal 230 and the internal housing 222.

Figure 5:
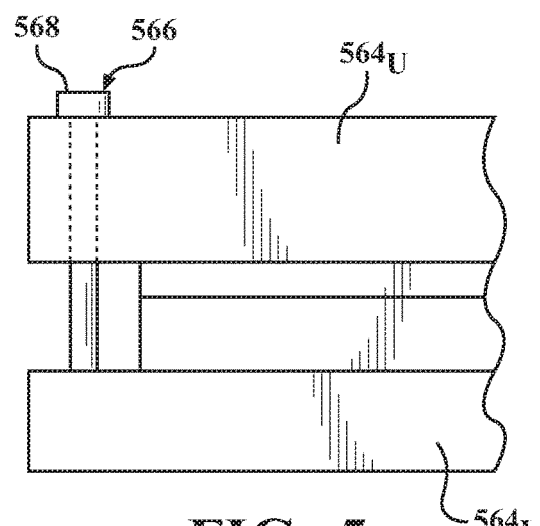
FIG. 5 is an enlargement of the area of detail shown in FIG. 3.

FIG. 5 illustrates another method of connecting the seal 230 to the display module 224 (and/or the internal housing 222) using one or more endplates 564. Although shown and described in connection with the seal 230 and the display module 224, similar or identical structures may be also utilized to secure together the seal 230 and the internal housing 222. The endplate(s) 564 may be formed from any suitable material (e.g., plastic, polymeric or metallic materials, etc.), and, thus, may include materials more rigid than those used in the manufacture of the seal 230.

To connect the seal 230 to the endplate 564 (and/or the chassis 234), one or more PSA(s) may be utilized, as discussed above. Additionally, or alternatively, the seal 230, the endplate(s) 564, and/or the chassis 234 may be mechanically connected. For example, in the embodiment seen in FIG. 5, upper and lower endplates 564u, 564L are positioned adjacent to the chassis 234 and the seal 230, respectively, and are secured together via a fastener 566 (e.g., a screw 568, rivet, bolt, or the like) that extends through the endplates 564u, 564L. The fastener 566 allows for the application of a compressive force to the seal 230 where necessary or desirable.

Figure 6:
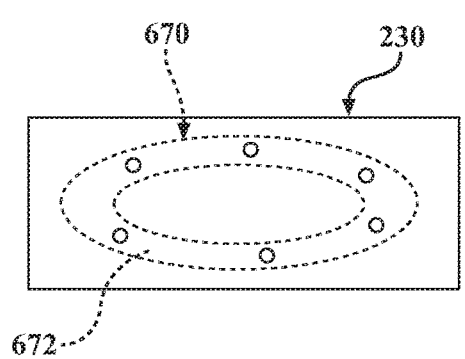
FIG. 6 is a partial, top, plan view of an alternate embodiment of the seal including a mounting structure.
Figure 7:
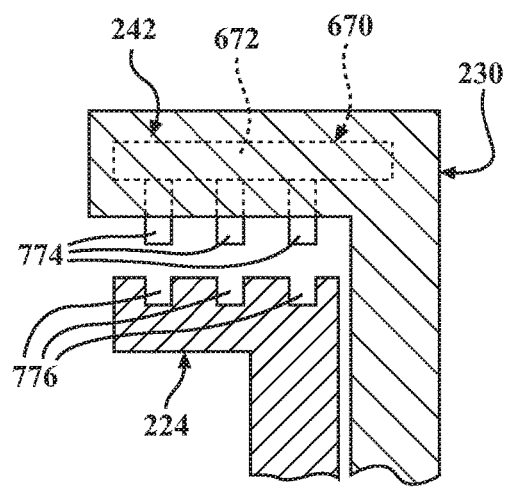
FIG. 7 is a partial, cross-sectional view of the embodiment of the seal seen in FIG. 6 illustrating connection with an embodiment of the display module.
Figure 8:
FIG. 8 is a partial, side, perspective view of the seal seen in FIGS. 2A and 3.

To assist in the securement of the seal 230 to the display module 224 and/or the internal housing 222, the seal 230 may include one or more mounting structures 670 (FIG. 6), which may be positioned internally within the seal 230 or may be attached to an external surface of the seal 230. For example, as seen in FIG. 6, the seal 230 may include an internal mounting ring 672 (e.g., embedded within the flanges 242, 250). It is envisioned that the mounting structure 670 may add rigidity to the seal 230 at the area of attachment to the internal housing 222 and/or the chassis 234, or that the mounting structure 670 may facilitate connection to the internal housing 222 and/or the chassis 234. For example, as seen in FIG. 7, it is envisioned that the mounting structure 670 may include a series of detents 774 (e.g., extensions, projections, etc.) that are configured for receipt and engagement within corresponding openings 776 defined by the internal housing 222 and/or the chassis 234 to establish a mechanical interlock (e.g., a snap-fit or an interference fit).

With reference now to FIGS. 2A, 2B, 3, and 8, the geometry of the seal 230 will be discussed. In a normal position (e.g., a position in the range of motion of the display module 224 in which the seal 230 is not subject to any external stress), the first segment 240 of the seal 230 includes a generally linear configuration, and the second segment 248 (which extends from the first segment 240) includes a generally arcuate configuration, as seen in FIG. 2A. In the illustrated embodiment, the seal 230 thus includes a generally J-shaped cross-sectional configuration in which the flanges 242, 250 are positioned at different heights in the normal position. Alternatively, the segments 240, 248 may each include a generally linear configuration and may be separated by a segment 249 that is generally arcuate in configuration, as seen in FIG. 2B. In contrast to the embodiment seen in FIG. 2A, in the normal position, the flanges 242, 250 of the seal 230 are at approximately the same height and the seal 230 includes a generally U-shaped cross-sectional configuration. The segments 240, 248, 249 of the seal 230 may be of continuous, unitary construction, or the segments 240, 248, 249 of the seal 230 may be separated by seams or joints that are secured together using, for example, welds, glue, heat treatments, melting, or other joining methods.

As the display module 224 is repositioned in relation to the lens 228 and the internal housing 222, however, the seal 230 is subjected to an external force that deforms the seal 230, which is tolerated and facilitated by the material(s) used in the manufacture of the seal 230. More specifically, as can be appreciated through reference to the transition illustrated between FIGS. 2A and 3, as the distance D between the display module 224 and the lens 228 decreases, the first segment 240 deforms by bending and deflecting towards the internal housing 222, and the second segment 248 deforms by "rolling" onto itself and such that the inflection point P (FIG. 3) defined by the segment 248 is shifted laterally in the direction indicated by arrows 3. Conversely, as the distance D between the display module 224 and the lens 228 increases, the first segment 240 straightens and deflects towards the chassis 234, and the second segment 248 "unrolls" such that the inflection point P is shifted laterally in the direction indicated by arrows 4. The J-shaped configuration of the seal 230 seen in FIGS. 2A, 3, and 8 thus allows for lateral movement in the seal 230 during longitudinal movement of the display module 224.

By varying the particular geometry of the seal 230 (e.g., the configuration of the seal 230, the length of the seal 230, the thickness of the seal 230, etc.), the resistance to movement of the display module 224 offered by the seal 230 can be altered and customized to allow for variation in the output force required by the actuator 236 to reposition the display module 224 (e.g., during focus adjustment). For example, by adjusting the overall dimensions of the seal 230, contact between the seal 230 and the internal housing 222 (seen in FIG. 3) may be reduced (or eliminated entirely), thereby reducing friction and the corresponding output force required by the actuator 236. A reduction in the required output force of the actuator 236 (FIG. 2A) allows for the use of smaller and/or less powerful actuators 236 in those implementations in which interior space may be limited and/or the overall weight of the display system 10 (FIG. 1) may be of increased concern. For example, in the context of a wearable HMD 12 (FIG. 1), tuning the seal 230 to permit the use of a smaller, lighter actuator 236 may provide for a more comfortable user experience. The resistance to movement offered by the seal 230 can be further varied by altering the material(s) used in the construction of the seal 230. For example, more compliant and/or flexible materials (such as silicone, for example) reduce the overall force that must be applied to the display module 224 to cause the requisite deformation of the seal 230 when compared to more rigid materials.

As mentioned above, during the life of the display system 10, the display module 224 can experience a large number (e.g., millions) of movement cycles. Thus, it can be useful to utilize materials in the construction of the seal 230 with high cycle-to-failure characteristics so as to increase the usable life of the seal 230. Moreover, through the employ of a configuration with continuous slopes, stress concentrations can be reduced to inhibit localized failure (e.g., tearing).

Figure 9:
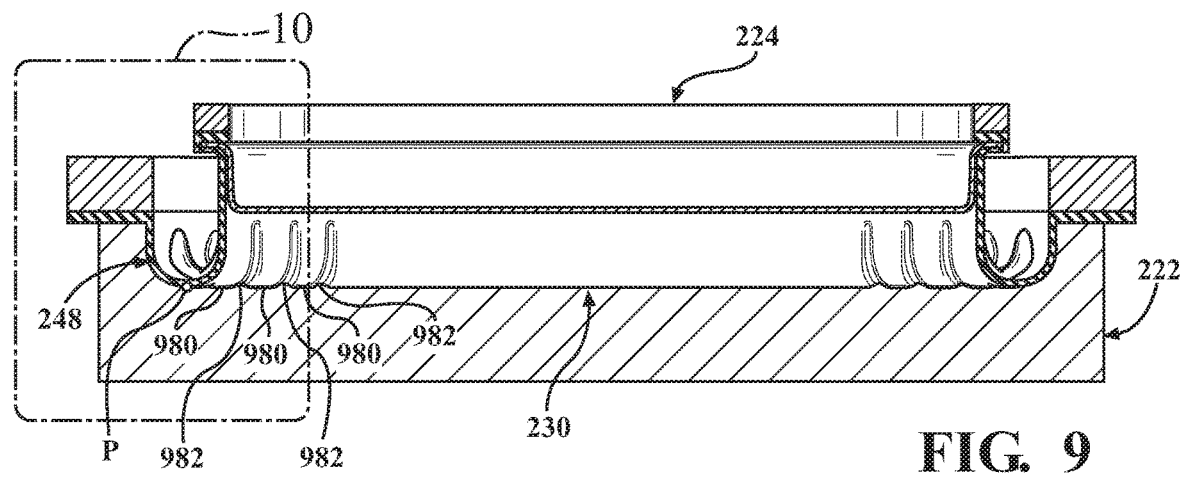
FIG. 9 is a partial, side, perspective view of an alternate embodiment of the seal including a corrugated portion.
Figure 10:
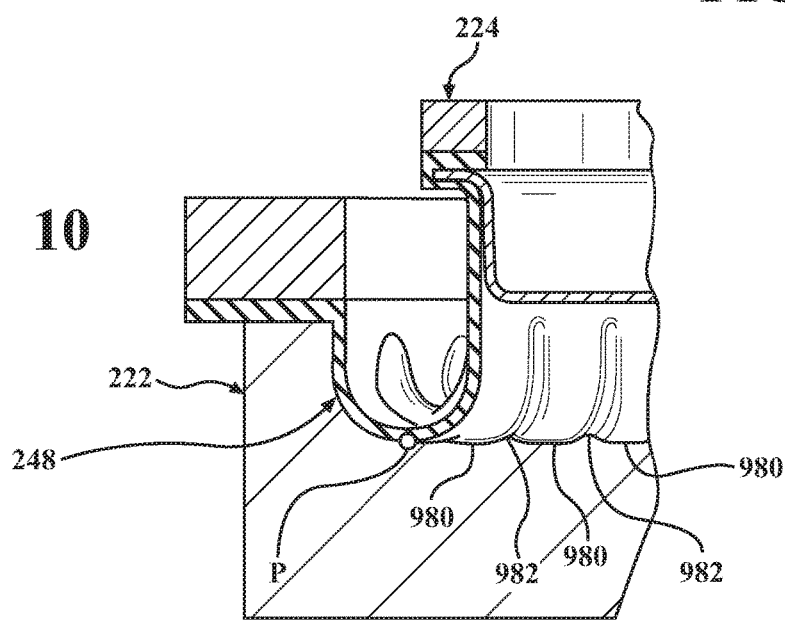
FIG. 10 is an enlargement of the area of detail shown in FIG. 9.

To increase predictability and control over the deformation experienced by the seal 230 during movement of the display module 224, in certain embodiments, it is envisioned that the seal 230 may include areas of non-uniformity in cross-section to create areas of weakness which may be more prone to deformation. For example, as seen in FIGS. 9 and 10, the seal 230 (e.g., the second segment 248) may include a corrugated portion 978, which may extend across a portion of the seal 230 only, as seen in FIG. 9, or across the entirety of the seal 230.

The corrugated portion 978 includes a series of convex corrugations 980 defined by concavities 982 that extend inwardly (e.g., towards the inflection point P). The presence of the corrugations 980 and the concavities 982 increase the surface area across which deformation (e.g., compression and expansion) occurs in the seal 230, thus reducing stiffness and the overall force required to deform (e.g., bend, deflect, or otherwise distort) the seal 230 during focus adjustment, for example. By selectively reducing stiffness at predetermined locations in the seal 230, deformation control and predictability can be increased to thereby reduce strain on the actuator 236 by focusing stress in certain areas and eliminating stress in others (e.g., at the interfaces between the seal 230, the internal housing 222, and the display module 224). Reducing unpredictability in the location of stress(es) may also reduce, if not entirely prevent, angular distortion ("jittering") of the display module 224 and thus increase the overall stability of the system.

Depending upon the particular requirements of the display system 10 (e.g., internal spatial allowances, system architecture, etc.) and the particular geometry of the seal 230, it is envisioned that the number, configuration, and/or dimensions of the corrugations 980 and the concavities 982 may be varied in alternate embodiments of the disclosure. For example, by increasing or decreasing the dimensions of the corrugations 980 and/or the thickness of the seal 230 at and/or between the corrugations 980 (i.e., the thickness of the seal at the concavities 982), the resistance to movement of the display module 224 may be increased or decreased. Moreover, by varying the geometry of the corrugations 980, predictability and control over deformation can be further increased, thus allowing for added regulation over stress concentrations and reductions in strain.

With reference now to FIGS. 1-3, general operation of the display system 10 will be discussed. To address issues with focus during use, the display module 224 is repositioned to move the display panel 232 within the interior space 238 (e.g., via the application of force to the chassis 234 by the actuator 236) to vary the distance D between the display panel 232 and the lens 228. More specifically, the position of the display module 224 is varied along the Y-axis via movement in the directions indicated by arrows 1 and 2 (FIG. 2A). As the display module 224 moves in the direction indicated by arrow 1 (e.g., towards the lens 228), the seal 230 deforms to accommodate and maintain engagement with the internal housing 222 and the display module 224, during which deformation, the respective first and second segments 240, 248 of the seal 230 shift laterally towards the internal housing 222. As seen in FIG. 3, in the illustrated embodiment, the seal 230 is deflected into contact with the internal housing 222. It should be appreciated, however, that contact with the internal housing 222 may be avoided depending upon the specific configuration and dimensions of the seal 230, the spatial allowances of the system architecture, the position of the other internal components of the display system 10, as discussed above.

As the display module 224 moves in the direction indicated by arrow 2 (i.e., away from the lens 228), the seal 230 is again deformed and returns to the initial configuration seen in FIG. 2A, during which the respective first and second segments 240, 248 of the seal 230 shift laterally away from the internal housing 222.

During movement of the display module 224 through its range of motion, the deformable nature of the seal 230, the materials of construction used in the manufacture thereof, and the configuration of the seal 230 allow for minimal drag. The seal 230 thus offers little resistance or interference with operation of the actuator 236. Moreover, the configuration of the seal 230 allows for smooth deformation by reducing (if not entirely preventing) stress concentrations in the seal 230 that might otherwise result in system noise and/or progressive damage to the seal 230.

With reference now to FIGS. 11-20, alternate embodiments of the seal 230 will be discussed. The embodiments illustrated in FIGS. 11-20 are substantially similar to the seal 230 discussed above with respect to FIGS. 1-10, and, accordingly, in the interest of brevity, will only be discussed with respect to any difference therefrom.

Figure 11:
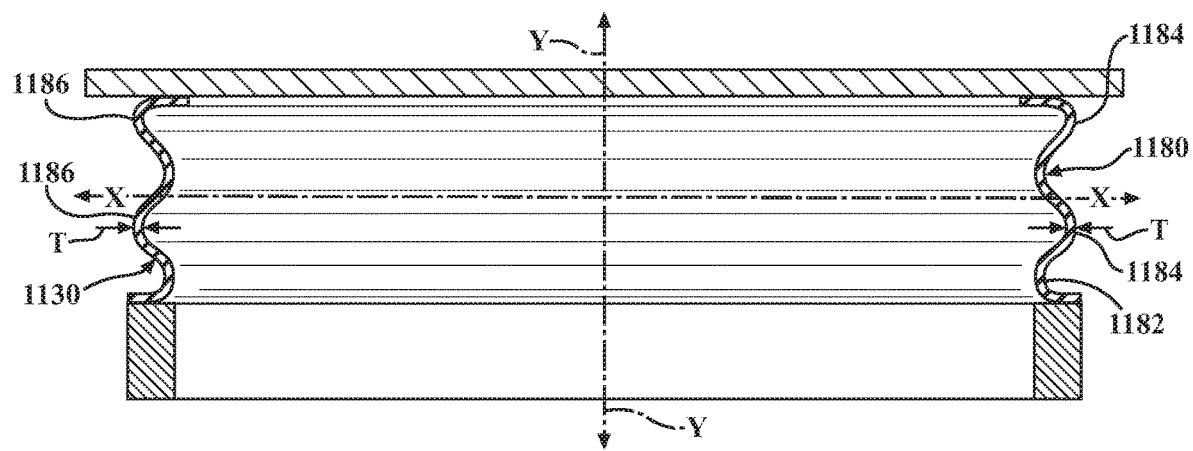
FIG. 11 is a partial, cross-sectional view of an alternate embodiment of the seal including a bellows portion.
Figure 12:
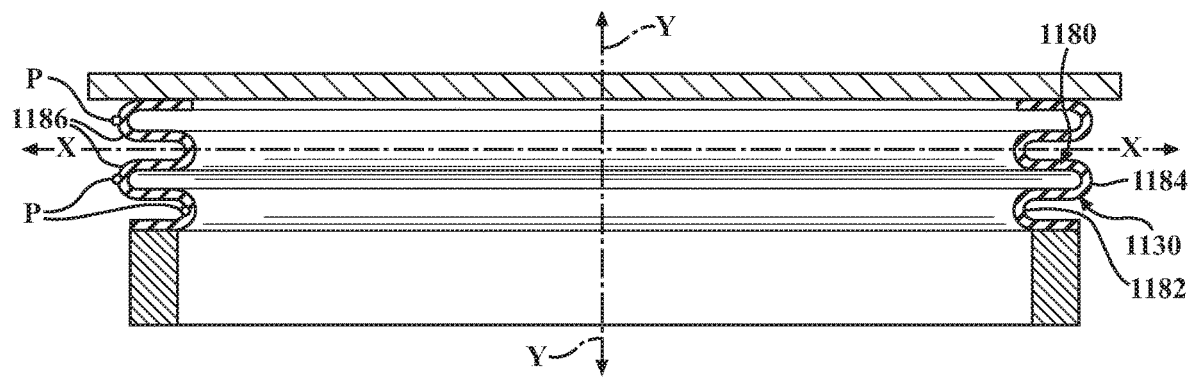
FIG. 12 is a partial, cross-sectional view of the embodiment of the seal seen in FIG. 11 under compression.

FIGS. 11 and 12 illustrate an embodiment of the seal (identified by the reference character 1130) that includes a bellows portion 1180. The bellows portion 1180 includes alternating concave portions 1182 and convex portions 1184 with interconnected, generally arcuate wall portions 1186. The arcuate wall portions 1186 deflect during movement of the display module 224 (FIGS. 2A, 3) in relation to the internal housing 222 to allow for lateral and longitudinal expansion and compression of the seal 1130 as the seal 1130 deforms. More specifically, as the seal 1130 moves from the position seen in FIG. 11 to the position seen in FIG. 12, the seal 1130 compresses longitudinally (along the Y-axis) and expands laterally (along the X-axis), and as the seal 1130 moves between the position seen in FIG. 12 to the position seen in FIG. 11, the seal 1130 expands longitudinally (along the Y-axis) and compresses laterally (along the X-axis). During expansion and compression of the seal 1130, the curvature of the concave portions 1182 and the convex portions 1184 is varied, which allows for controlled deflection of the seal 1130 and reduced stress upon the actuator 236 (FIG. 2A). As discussed above in connection with the seal 230 (FIGS. 2A, 3), depending upon the particular requirements of the display system 10 (e.g., internal spatial allowances, system architecture, etc.) and the particular geometry of the seal 1130, it is envisioned that the number, configuration, and/or dimensions of the concave portions 1182 and the convex portions 1184 may be varied in alternate embodiments. For example, the number and/or curvature of the concave portions 1182 and the convex portions 1184 may be increased or decreased. Additionally, although the seal 1130 is illustrated as having a generally uniform cross-sectional dimension (i.e., a thickness T), to allow for further variation and customization in the operation of the seal 1130 (e.g., to influence the output force required by the actuator 236), in alternate embodiments, the thickness T of the seal 1130 may be varied in one or more locations. For example, it is envisioned that the thickness T of the seal 1130 may be increased or decreased at the inflections points P.

The bellows portion 1180 allows for reduced lateral deflection in the seal 1130 (e.g., in relation to the J-shaped seal 230 discussed above and seen in FIGS. 2A and 3, for example) during movement of the display module 224 (FIGS. 2A, 3). The seal 1130 may thus find added utility in those implementations of the display system 10 with limited lateral (X-stack) availability.

Figure 13:
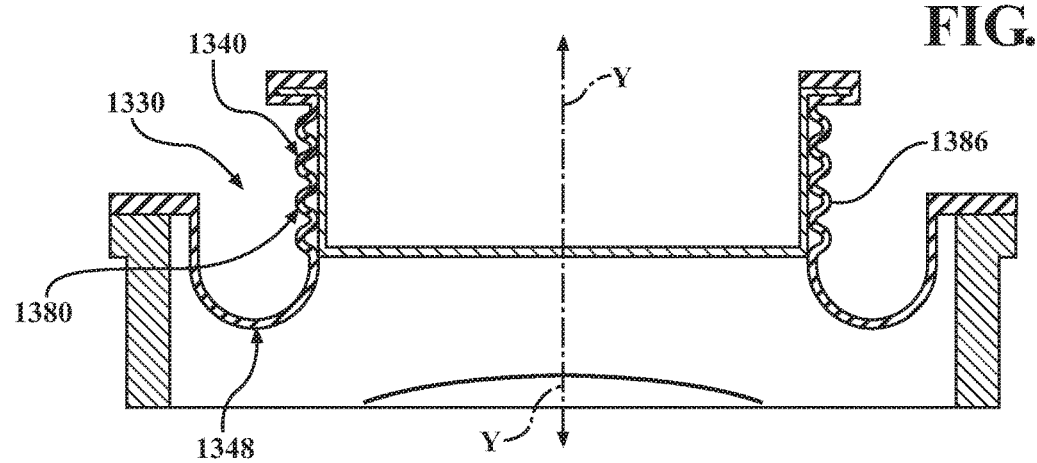
FIG. 13 is a partial, cross-sectional view of the display system seen in FIG. 1 including an alternate embodiment of the seal including a bellows portion having arcuate wall portions.
Figure 14:
FIG. 14 is a partial, cross-sectional view of the display system seen in FIG. 1 including an alternate ("accordion style") embodiment of the seal including a bellows portion having linear wall portions.

FIG. 13 illustrates another embodiment of the seal, which is identified by the reference character 1330. The seal 1330 is generally J-shaped in configuration and, thus, includes respective first and second segments 1340, 1348 (as discussed above in connection with the seal 230 seen in FIGS. 2A and 3). In contrast to the seal 230, however, the first segment 1340 is non-linear in configuration and, instead, incorporates a bellows portion 1380 similar to that discussed above with respect to FIGS. 11 and 12. Although illustrated as including generally arcuate wall portions 1386 in FIG. 13, it should be appreciated that the portions 1382, 1384 may be replaced by generally linear wall portions 1488 that are interconnected so as to define vertices (apices) 1490, as seen in FIG. 14.

Figure 15:
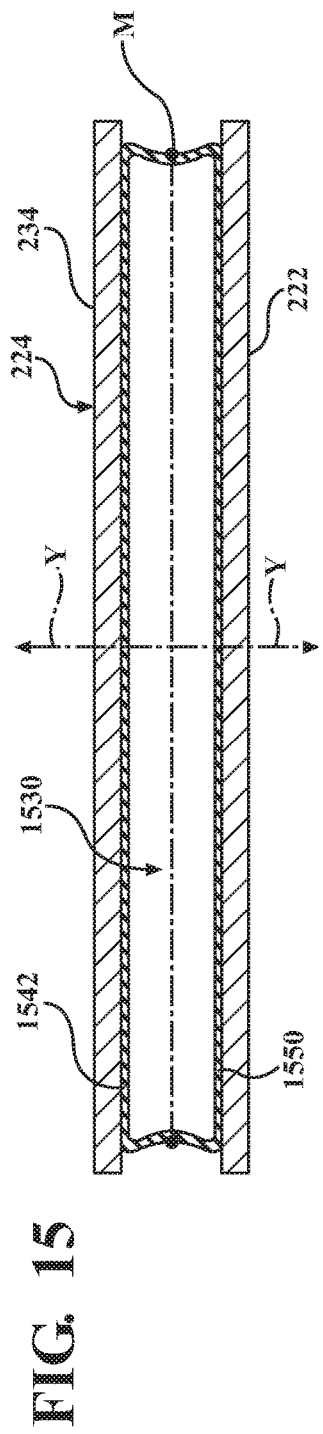
FIG. 15 is a partial, cross-sectional view of an alternate embodiment of the seal including a C-shaped configuration having a curvature that extends inwardly.
Figure 16:
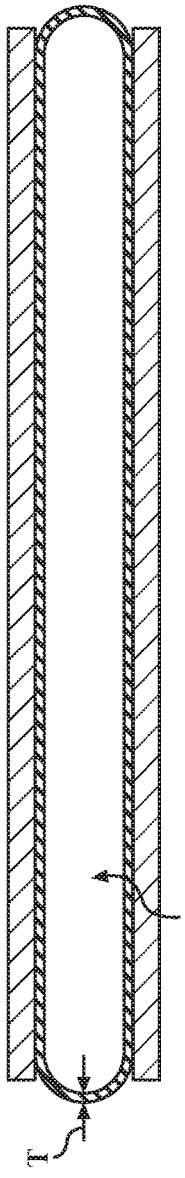
FIG. 16 is a partial, cross-sectional view of an alternate embodiment of the seal including a C-shaped configuration having a curvature that extends outwardly.

FIGS. 15-18 illustrate an embodiment of the seal (identified by the reference character 1530) that includes a generally uniform curvate cross-sectional configuration. More specifically, the seal 1530 is generally C-shaped in configuration and defines upper and lower flanges 1542, 1550 that are configured for engagement with the display module 224 (e.g., the chassis 234) and the internal housing 222, respectively. As seen in FIGS. 15 and 16, in alternate embodiments, the curvature of the seal 1530 may be reversed such that the seal 1530 extends either inwardly or outwardly, depending, for example, upon spatial requirements, the particular location of the internal components of the display system 10, etc.

Figure 17:
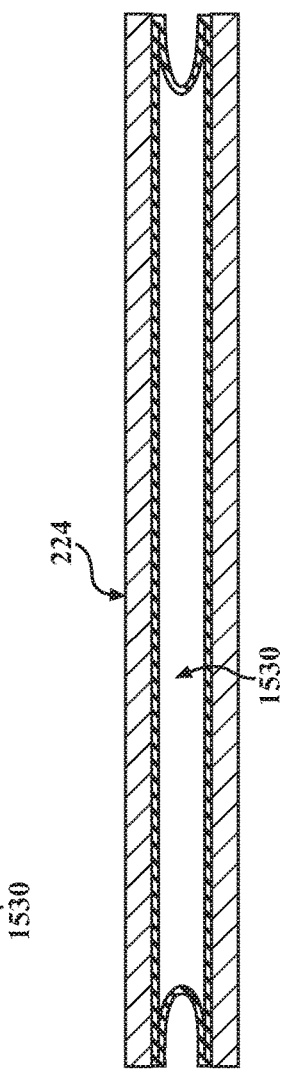
FIG. 17 is a partial, cross-sectional view of the embodiment of the seal seen in FIG. 15 under compression.
Figure 18:
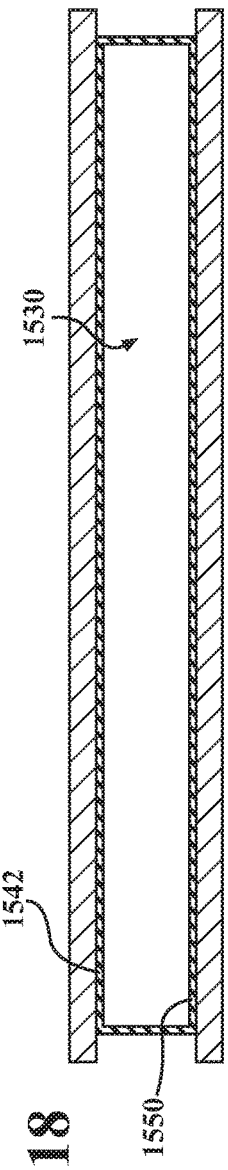
FIG. 18 is a partial, cross-sectional view of the embodiment of the seal seen in FIG. 15 upon expansion.

As can be appreciated through reference to the transition illustrated between FIGS. 15 and 17, during translation of the display module 224 along the longitudinal axis Y, the seal 1530 experiences longitudinal expansion and compression. More specifically, during compression, the curvature defined by the seal 1530 is increased, as seen in FIG. 16, and during expansion, the curvature defined by the seal 1530 is decreased, as seen in FIG. 15. Depending upon the particular material of construction used in the manufacture of the seal 1530, the particular actuator 236 (FIG. 2A) used in the display system 10 (FIG. 1), etc., it is envisioned that the seal 1530 may be expanded and/or stretched such that the seal 1530 extends between the flanges 1542, 1550 in a generally linear configuration, as seen in FIG. 18.

Depending upon the particular requirements of the display system 10 (e.g., internal spatial allowances, system architecture, etc.) and the particular geometry of the seal 1530, it is envisioned that the cross-sectional configuration and/or dimensions of the seal 1530 may be varied. For example, although the seal 1530 is illustrated as having a generally uniform thickness T (FIG. 16) in the embodiments seen in FIGS. 15-18, to allow for further variation and customization in the operation of the seal 1530 (e.g., to influence the output force required by the actuator 236 (FIG. 2A)), in alternate embodiments, the thickness T of the seal 1530 may be varied in one or more locations. For example, the thickness T of the seal 1530 may be reduced in certain locations and/or increased in others. In one particular implementation, to guard against fatigue and failure, it is envisioned that the thickness T of the seal 1530 may be increased in areas of increased deflection (e.g., at a midline M (FIG. 15) of the seal 1530).

FIG. 19 illustrates another embodiment of the seal, which is identified by the reference character 1930. The seal 1930 includes a generally S-shaped (sinusoidal) configuration defined by arcuate segments 1992, 1994 that curve in opposing directions. As seen in FIG. 19, the segment 1992 is connected to the display module 224 and the segment 1994 is connected to the internal housing 222.

During translation of the display module 224, as the distance D between the display module 224 and the lens 228 is decreased, the segments 1992, 1994 of the seal 1930 may deform (via "rolling") such that the inflection points $P_1$, $P_2$ defined by the segments 1992, 1994, respectively, are shifted laterally in the direction indicated by arrows 3. Conversely, as the distance D between the display module 224 and the lens 228 is increased, the segments 1992, 1994 of the seal 1930 are allowed to "unroll" such that the inflection points $P_1$, $P_2$ are shifted laterally in the direction indicated by arrow 4.

Although illustrated as being directly connected in the embodiment illustrated in FIG. 19, in an alternate embodiment, it is envisioned that the segments 1992, 1994 may be separated by an intervening segment 2096, as shown in FIG. 20. While illustrated as including the aforedescribed bellows portion 1180, it should be appreciated that the intervening segment 2096 may assume alternate configurations in additional embodiments of the disclosure. For example, the intervening segment 2096 may include an accordion-style configuration (FIG. 14), the intervening segment 2096 may include a generally linear configuration, the intervening segment 2096 may include an arcuate configuration, etc.

Additionally, as discussed above in connection with FIGS. 9 and 10, it is envisioned that either or both of the segments 1992, 1994 may include corrugations 980 to increase the surface area across which deformation (i.e., compression and expansion) occurs in the seal 1930, thus reducing stiffness and the overall force required to bend, deflect, or otherwise distort the seal 1930 during focus adjustment, for example, and increasing predictability in deformation.

With reference now to FIG. 21, in each embodiment of the disclosure discussed above, the display module 224 is described as being movable along a single axis (i.e., the longitudinal axis Y). It is envisioned, however, that in alternate embodiments, the display module 224 (and/or the lens 228) may be movable along one or more additional axes to allow for enhanced correction during use. For example, the display module 224 and/or the lens 228 may be movable along a (horizontal) axis X and/or along an axis Z that are each orthogonal in relation to the Y axis to allow for lateral movement as well as pivotable and/or rotational movement (e.g., to allow for corrections in distortion, alignment, or field-of-view issues, improvement in content accommodation, etc.). To facilitate such movement, it is envisioned that the configuration and/or orientation of the seal 230 may be varied. For example, as seen in FIG. 21, the seal 230 may be oriented such that the curvature defined by the second segment 248 of the seal 230 extends laterally (i.e., along the X-axis) as opposed to longitudinally (i.e., along the Y-axis), as illustrated in FIGS. 2A and 3, for example.

Figure 22:
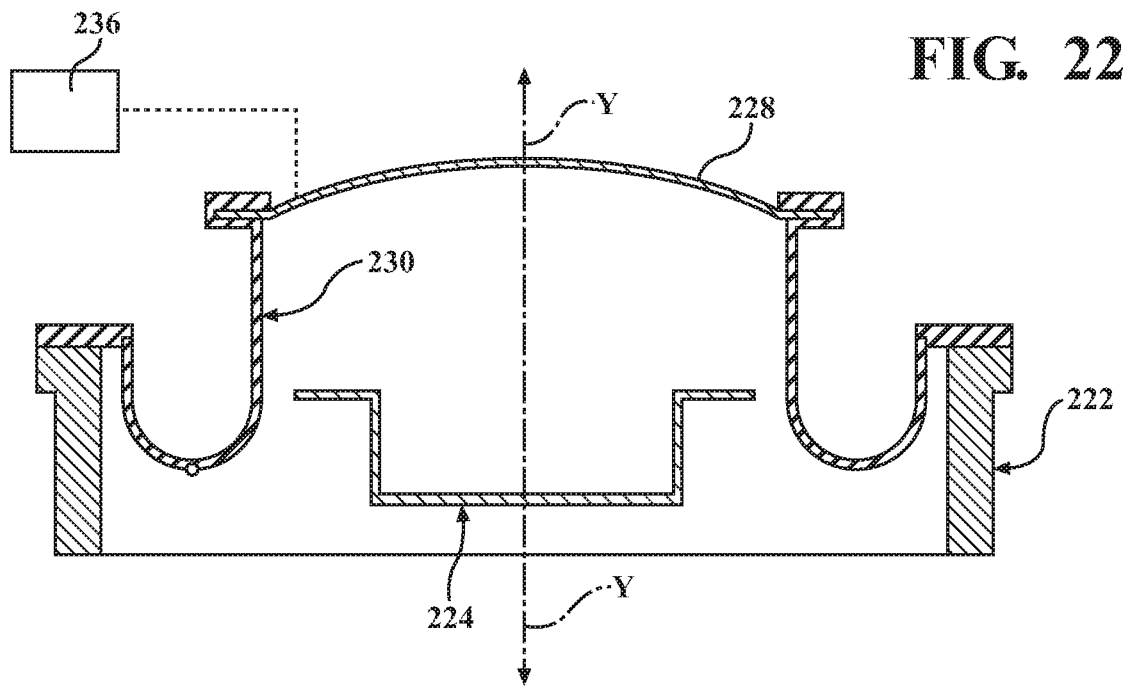
FIG. 22 is a partial, cross-sectional view of an alternate embodiment of the display system seen in FIG. 1 in which the lens is movable in relation to the display module.
Figure 23:
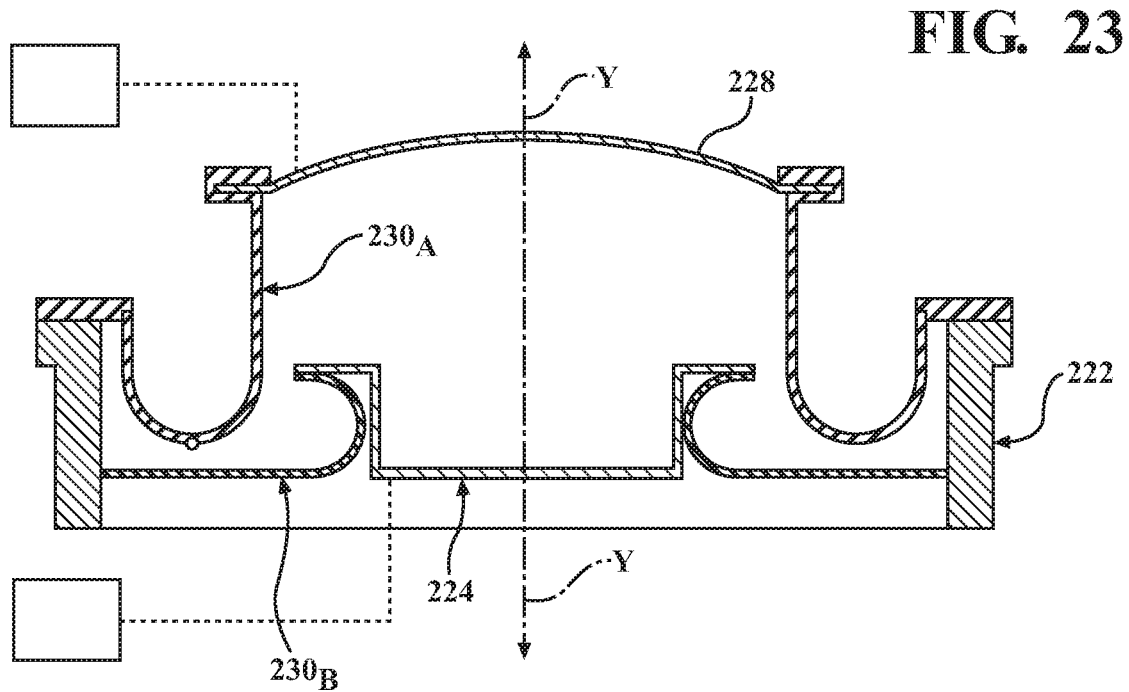
FIG. 23 is a partial, cross-sectional view of an alternate embodiment of the display system seen in FIG. 1, including multiple seals, in which the lens and the display module are each movable.

Referring now to FIGS. 22 and 23, in each of the aforedescribed embodiments, the display module 224 is described as being a movable component of the display system 10 (FIG. 1), and the lens 228 is described as being a fixed component. FIG. 22, however, illustrates an embodiment in which the display module 224 is a stationary component and the lens 228 is movably positioned within the internal housing 222 (via the actuator 236) to allow for focus adjustment of the display panel 232. As seen in FIG. 22, in such embodiments of the display system 10, the seal 230 extends from the lens 228 to the internal housing 222 to allow for deformation of the seal 230 in the manner described above during movement of the lens 228.

FIG. 23 illustrates another embodiment of the disclosure in which both the display module 224 and the lens 228 are movable in relation to the internal housing 222. As illustrated in FIG. 23, in such embodiments, it is envisioned that multiple seals 230A, 230B may be utilized. While each of the seals 230A, 230B is illustrated as being generally J-shaped in configuration, it should be appreciated that the configurations of the seals 230A, 230B may differ from one another in additional embodiments, depending, for example, upon the spatial allowances of the system architecture, the position of the other internal components of the display system 10 (FIG. 1), etc. For example, either or both of the seals 230A, 230B may be replaced by any of the alternate embodiments described herein, and, thus, may include a generally sinusoidal configuration (FIG. 19), a bellows portion 1180 (FIG. 11), etc.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone).

The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, such as from sensors or user profiles, to improve the delivery to users of content associated with the display system 10. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based delivery of content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring preferences based on non-personal information data or a bare minimum amount of personal information, such as the content being requested by the device associated with a user, other non-personal information available to the device, or publicly available information.

Persons skilled in the art will understand that the various embodiments of the disclosure described herein and shown in the accompanying figures constitute non-limiting examples. Additionally, persons skilled in the art will understand that the elements and features shown or described in connection with one embodiment may be combined with those of another embodiment without departing from the scope of the present disclosure.

In the preceding description, reference may be made to the spatial relationship between the various structures illustrated in the accompanying drawings and to the spatial orientations of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," etc., should be understood to describe a relative relationship between structures and/or a spatial orientation of the structures.

The use of terms such as "approximately" and "generally" should be understood to allow for variations in any numerical range or concept with which they are associated. For example, it is envisioned that the use of terms such as "approximately" and "generally" should be understood to encompass variations on the order of 25%, or to allow for manufacturing tolerances and/or deviations in design.

What is claimed is:

1. A wearable display system, comprising:
   a housing;
   a display module positioned within the housing and including a lens and a display panel; and
   a seal extending between the housing and the display module,
   wherein the seal is configured to allow relative movement between the lens and the display panel to adjust focus of the display panel,
   wherein the seal includes first and second segments with generally linear configurations and a third segment with an arcuate configuration that is positioned between the first and second segments, and
   wherein the seal includes a generally U-shaped configuration.

2. The display system of claim 1, wherein the seal is configured to inhibit water, moisture, particulate, debris, dust, or other foreign material from reaching the display panel and the lens by defining an enclosed interior space within the housing.

3. The display system of claim 1, wherein one of the first and second segments is connected to the display module and the other of the first and second segments is connected to the housing.

4. The display system of claim 1, wherein the third segment includes a series of corrugations to facilitate controlled deformation of the seal during relative movement between the lens and the display panel.

5. The display system of claim 1, wherein one of the first and second segments includes a bellows portion.

6. The display system of claim 5, wherein the bellows portion includes a series of interconnected arcuate wall portions.

7. The display system of claim 5, wherein the bellows portion includes a series of interconnected linear wall portions, wherein adjacent linear wall portions are connected to define vertices.

8. The display system of claim 1, wherein the display panel is movable in relation to the housing.

9. The display system of claim 8, wherein the lens is movable in relation to the housing.

10. A wearable display system, comprising:
a housing;
a display module positioned within the housing and including a lens and a display panel; and
a seal extending between the housing and the display module,
wherein the seal is configured to allow relative movement between the lens and the display panel to adjust focus of the display panel,
wherein the seal includes first and second segments with generally linear configurations and third and fourth segments with arcuate configurations that are positioned between the first and second segments, and
wherein the seal includes a generally S-shaped configuration.

11. The display system of claim 10, wherein at least one of the third or fourth segment includes a series of corrugations to facilitate controlled deformation of the seal during relative movement between the lens and the display panel.

12. A seal for use in a wearable display system including a housing and a display module movable relative to the housing to adjust focus, the seal including:
a first portion connectable to the housing; and
a second portion connectable to the display module,
wherein the seal includes corrugations to facilitate controlled deformation of the seal during relative movement of the display module, and
wherein the corrugations include a series of convex portions and concave portions that increase a surface area across which deformation occurs in the seal to reduce stiffness of the seal during focus adjustment.

13. The seal of claim 12, wherein the seal includes a generally J-shaped configuration.

14. The seal of claim 12, wherein the seal includes a generally U-shaped configuration.

15. The seal of claim 12, wherein the seal is configured to inhibit water, moisture, particulate, debris, dust, or other foreign material from reaching a surface of a display panel of the display module by defining an enclosed interior space within the housing.

16. The seal of claim 12, wherein the seal includes a generally S-shaped configuration.

17. A seal for use in a wearable display system including a housing and a display module movable relative to the housing to adjust focus, the seal including:
a first portion configured to connect to the housing; and
a second portion configured to connect to the display module,
wherein the first portion has an arcuate configuration, and
wherein the second portion has a linear configuration and includes a bellows portion.

18. The seal of claim 17, wherein the bellows portion includes a series of interconnected arcuate wall portions.

19. The seal of claim 17, wherein the bellows portion includes a series of interconnected linear wall portions, wherein adjacent linear wall portions are connected to define vertices.

20. The seal of claim 17, wherein the seal includes a generally J-shaped configuration.

* * * * *